United States Patent
Wilson

(10) Patent No.: US 6,179,435 B1
(45) Date of Patent: Jan. 30, 2001

(54) LIGHT ASSEMBLY

(75) Inventor: Graham John Wilson, Heswall (GB)

(73) Assignee: British Nuclear Fuels PLC (GB)

(*) Notice: Under 35 U.S.C. 154(b), the term of this patent shall be extended for 0 days.

(21) Appl. No.: 09/403,632

(22) PCT Filed: Apr. 20, 1998

(86) PCT No.: PCT/GB98/01151

§ 371 Date: Oct. 21, 1999

§ 102(e) Date: Oct. 21, 1999

(87) PCT Pub. No.: WO98/49489

PCT Pub. Date: Nov. 5, 1998

(30) Foreign Application Priority Data

Apr. 26, 1997 (GB) .................................................. 9708450

(51) Int. Cl.[7] ........................................................ F21S 8/00
(52) U.S. Cl. ........................... 362/147; 362/375; 362/376
(58) Field of Search .................................... 362/147, 374, 362/375, 376

(56) References Cited

U.S. PATENT DOCUMENTS

| 2,868,992 | 1/1959 | Monk . |
| 5,943,827 | * 8/1999 | Okerlund ................................. 52/28 |

FOREIGN PATENT DOCUMENTS

| 331 064 | 9/1989 | (EP) . |
| 1494949 | 12/1967 | (FR) . |
| 503393 | 4/1939 | (GB) . |
| 1109078 | 4/1968 | (GB) . |

* cited by examiner

Primary Examiner—Sandra O'Shea
Assistant Examiner—Ali Alavi
(74) Attorney, Agent, or Firm—Myers Bigel Sibley & Sajovec

(57) ABSTRACT

A lighting assembly (10) which extends through the thickness of a wall (14) having a first side (16) and a second side (20) is described. The lighting assembly (10) comprises at least one light source (46) to illuminate an area on the first side (16) of said wall (14) and means being included to enable replacement of said light source from the second side (20) of said wall (14) wherein said means includes at least one duct (30) extending at least part of the way from the first side (16) of the wall (14) to the second side (20) of the wall (14); light source carrier means (50) on which said light source is mounted, said light source carrier means (50) and said light source (46) being movable through said at least one duct (30) from said second side (20) to said first side (16); moving means (80) to move said light source (46) and said carrier means (50) through said at least one duct (30); and, power supply means to said light source (46).

17 Claims, 9 Drawing Sheets

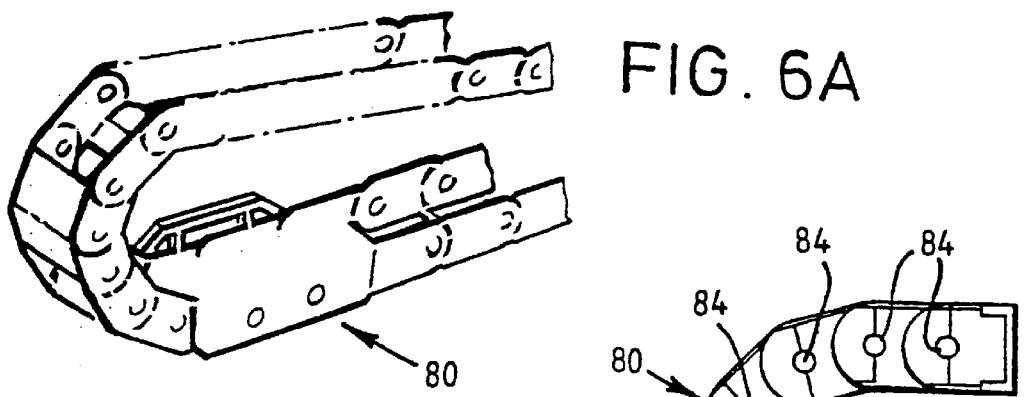
FIG. 6A
FIG. 6B
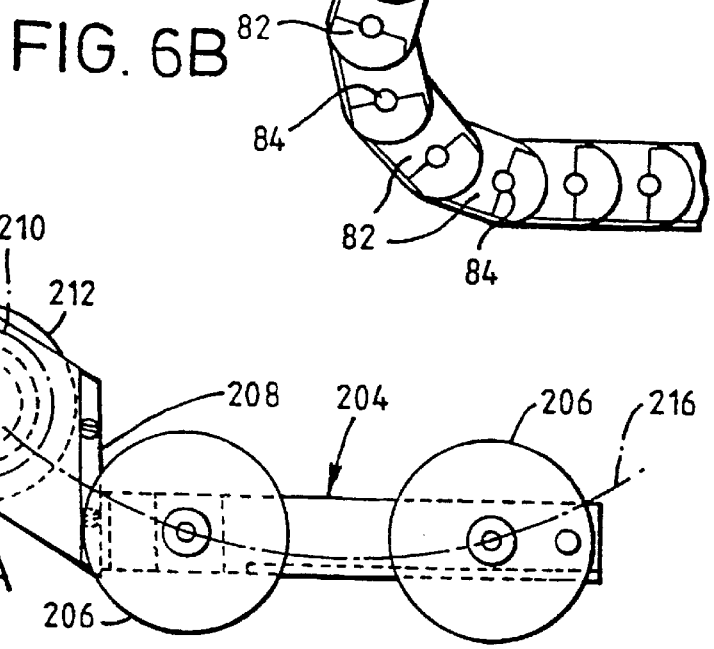
FIG. 11A
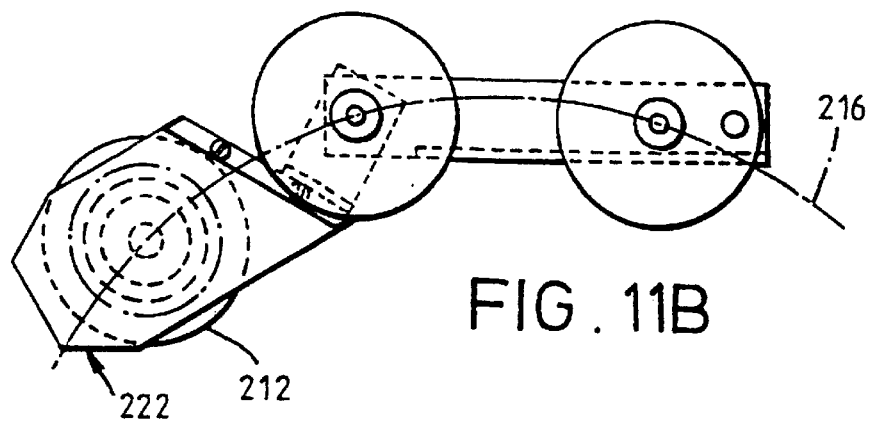
FIG. 11B

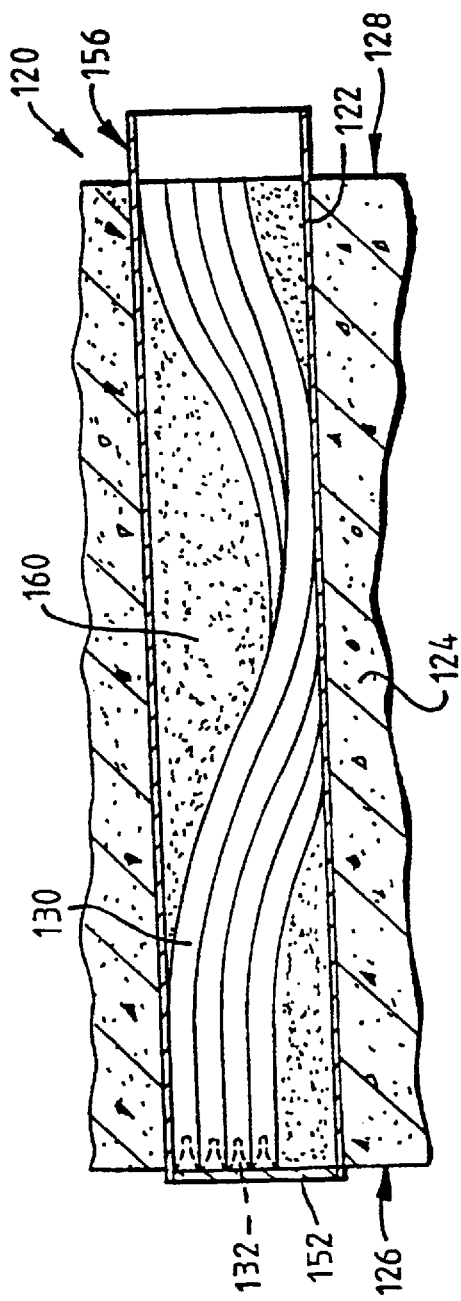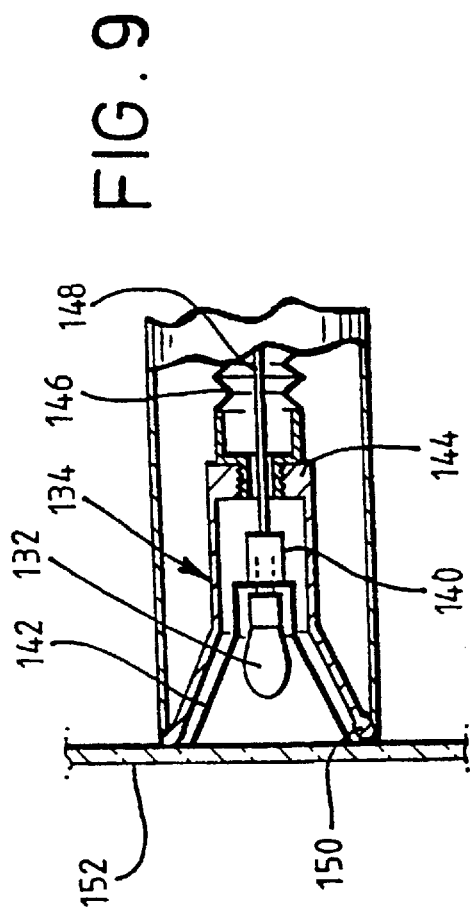

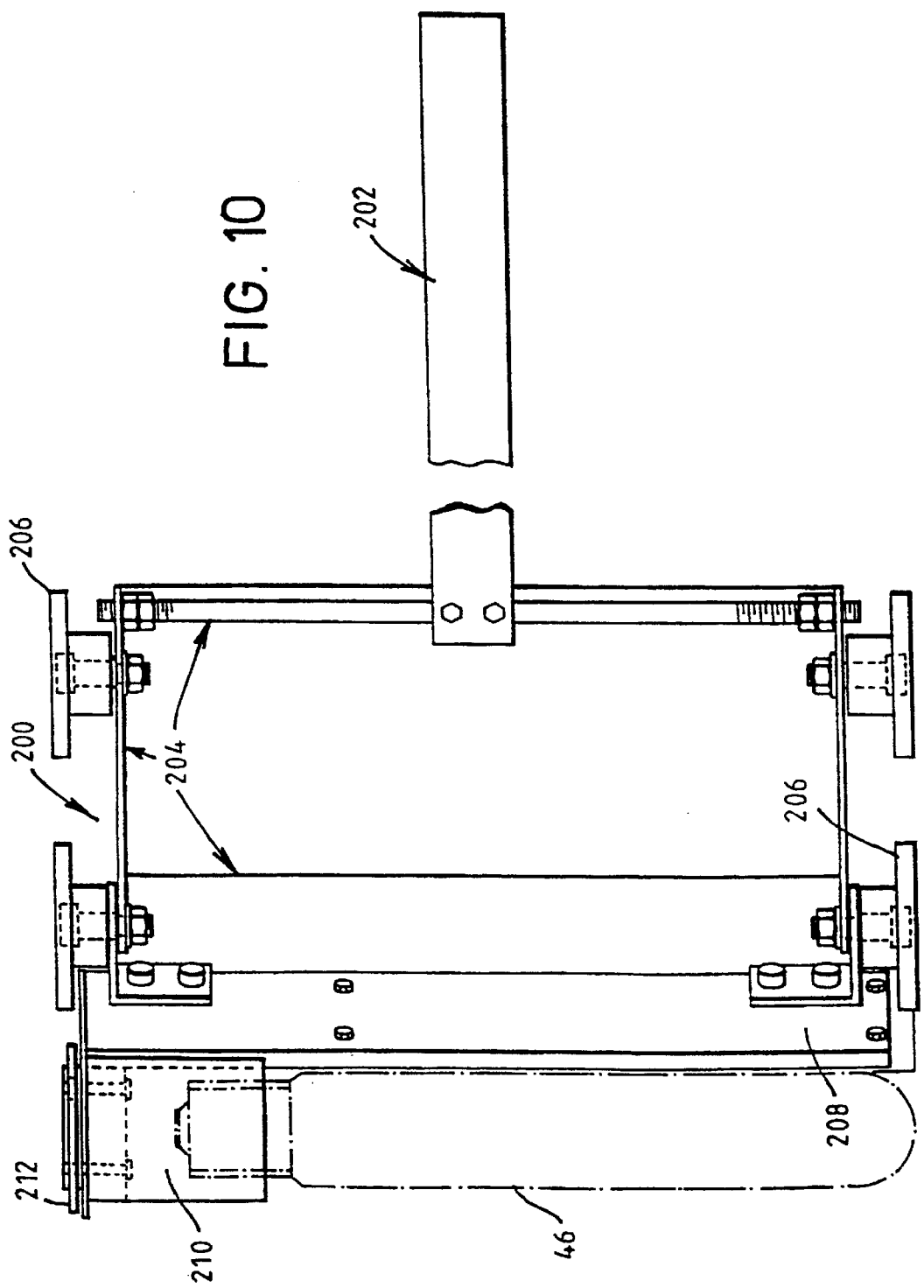

SHEILDING WALL
BRACKET
LAMP FIXTURE

SHEILDING WALL
CONTAMINATION BARRIER
REMOVABLE PLUG
LAMP FITTING

LIGHT ASSEMBLY

BACKGROUND OF THE INVENTION

1. Field of the Invention

The present invention relates to a lighting assembly which extends through a wall particularly, though not exclusively, for illuminating an un-manned area.

2. Description of the Prior Art

In un-manned areas such as, for example, so-called "caves" where radioactive materials are being remotely handled, it is necessary to provide a high level of illumination. Two principal types of lighting systems are used for lighting nuclear processing areas. The first is by sealed lighting units hung at stations within the cave and which are capable of being remotely disconnected and removed from the facility for maintenance as indicated schematically in FIG. 12. The second type are units inserted through the wall of the facility and have the lighting means emerging into an enclosed section with a window on the un-manned side to allow the light to shine on the area or objects to be viewed and as indicated schematically in FIG. 13.

The first type has the disadvantage that that the unit has to be removed from the radioactive area using remote handling equipment, potentially tying up scarce resources such as the in-cell crane and operators time for example. The removed unit then has to be transferred to a maintenance area for decontamination before it can be repaired, then to be reinstalled in its position within the cave using the crane again.

The second type of lighting system has an advantage over the first type in that the maintainable parts are located outside of the cave environment and there is no requirement for the use of cranes or manipulators within the cave so that processing is not interrupted nor is there any decontamination of the lighting device required which saves cost due to there being no waste arisings to be further processed. However, current designs of through-wall lighting systems of the second type have their own particular disadvantages which relate mainly to weight and safety aspects. Current designs of throughwall lights necessitate the removal of a large shielding wall plug comprising mainly concrete grout and which weighs in the region of 700 kgs. The wall plug is unwieldy and awkward to extract as the wall has a thickness of some 1–1.5 m and requires special equipment by way of a handling device weighing about 1000 kgs and specially trained personnel using a procedure which ensures that no radiation hazard is produced.

When nuclear processing facilities are built, many additional lighting units are initially installed to provide for redundancy and the fact that new light tubes will all be installed simultaneously and hence likely to fail at about the same time.

Currently, about 20 man hours are required to change a light tube in known through-wall lighting designs.

A further disadvantage of current designs is that although they have a closed cover into which the light tube emerges in use, this cover is sometimes broken accidentally by a manipulator or in-cell crane for example. Thus, when the light tube is to be replaced, it is necessary for a much more rigorous and hence time consuming and expensive procedure due to the safe-side of the wall being open to contamination by radioactive dust and debris for example.

SUMMARY OF THE PRESENT INVENTION

It is an object of the present invention to provide a through-wall lighting unit which allows easier, more economic and safer maintenance and replacement of failed lights than existing systems.

According to the present invention, there is provided a lighting assembly which extends through the thickness of a wall having a first side and a second side, the assembly having at least one light source to illuminate an area on the first side of said wall and means being included to enable replacement of said light source from the second side of said wall wherein said means includes at least one duct extending at least part of the way from the first side of the wall to the second side of the wall; light source carrier means on which said light source is mounted, said light source carrier means and said light source being movable through said at least one duct from said second side to said first side; moving means to move said light source and said carrier means through said at least one duct; and, power supply means to said light source.

In the present invention, the light source may be any required light source for the purpose intended. Examples of light sources may include generally rounded light bulbs, quartz-halogen bulbs, light tubes such as high-intensity sodium tubes or any other desired light source. The main requirement is that the shape of the passage through the duct and the carrier means may be adapted to the type and shape of light source in question.

Furthermore, the method and apparatus of the present invention for deploying a light source may also be used to locate and deploy other lighting and surveillance means such as cameras, fibre optics for lighting or lasers or cameras or video recording apparatus for example. Therefore, any reference to 'light sources' should be taken to include such alternative devices and apparatus.

The lighting assembly according to the present invention may also include location means at the first side to locate the light source in a desired position.

The number of ducts within the lighting assembly may be partially dependent upon the shape of the light source itself. In the case where the light source is of generally rounded form, there may be a plurality of ducts. Where the shape of the light source is of generally elongate tubular form, there may be only one duct.

The lighting assembly according to the present invention may be intended for a nuclear processing facility. However, the lighting assembly of the present invention may equally well be employed in other special environments such as clean rooms, sterile areas and explosive atmospheres for example.

The component parts of the lighting assembly of the present invention may be contained within a container housing which is adapted to fit closely within a shaped aperture in the wall through which the assembly is to extend or, in the case of new facilities being built, the shape of the aperture through the wall may be such as to conform to the shape of the lighting assembly housing. The wall aperture may alternatively have a liner therein adapted to seal against said container housing for increased confidence against leakage of contaminants from the first side to the second side.

The end of the container housing adjacent the first side of the wall may include reflector means of a desired shape to enable said light source to illuminate the area on the first side in a particular manner. The shape of the reflector means required will be known to those people skilled in the lighting art and will not be elaborated on further. The location means may locate the light source in a position consistent with the requirements of the reflector means to permit efficient illumination. The location means may contain features which automatically locate the light source in the desired position on being moved to the first side of the duct.

Since there is no need to remove the container housing from the wall during replacement of the light source in the lighting assembly according to the present invention, the container housing may be filled in the free volume about the duct by, for example, concrete grout in the same manner as existing lighting systems but which do need to be removed during light source changes. Thus, in the present invention, materials, such as the grout for example, which are fully characterised and quantified may be used so that confidence in the shielding efficiency of the lighting assembly of the present invention is as high as with prior art systems.

The duct, in the case of a lighting assembly intended for a nuclear processing facility may be non-linear so as to preclude a so-called direct shine path being available from the first side to the second side. In one embodiment of a lighting assembly according to the present invention, the shape of the duct from a side elevation may be of a generally sinusoidal-type form but its precise shape will be dependent upon the requirements for the prevention of the passage of primarily y rays by internal reflection in the duct from the first side to the second side. The cross-sectional shape of the duct may be generally rectangular.

In a second embodiment of the present invention where there are a plurality of ducts, these may be "twisted together", each duct being generally in the form of a helix extending from the second to the first side; the cross-sectional shape of each duct being generally circular. In this second embodiment, the shape of the individual light sources may be generally rounded.

The form and type of the light source carrier means may be largely determined by the shape and positional requirements of the light source and consequently by the cross-sectional shape of the duct. In a first embodiment of the present invention where the light source is of elongate tubular form which should desirably be positioned in a horizontal attitude and specific location relative to a reflector means to achieve a downwardly illumination direction, the carrier means may comprise a trolley or bogey on which the light source may be mounted at a front end thereof relative to the first side. The trolley may have means to maintain it in a desired spatial orientation and position within the duct. Such means may comprise jockey wheels, for example, running on internal horizontal and/or vertical surfaces of the duct.

In a second embodiment of the present invention, the carrier means may comprise generally rounded light source holders able to be slid or pushed through the duct by the moving means.

Where the duct is non-linear, flexible placement and retractor moving means are required to enable the light source to be passed through the duct and be placed at its desired location at the first side and to be retracted therefrom to enable replacement of the light source. In a first embodiment where the duct is of generally rectangular internal cross-sectional shape, the flexible placement and retractor moving means may comprise the type of plastics material chain-track conveyor having hollow box-like segments in linear array and pivoted to each other and commonly used on machine tools and conveying systems for example for grouping together and protecting moveable power supply leads or cables and preventing snagging and kinking thereof; such chain-track being flexible in a single plane. Power supply cables to the light source may be run through the flexible moving means and in which they are protected and prevented from snagging during movement of the light source and carrier means. The moving means may alternatively comprise a flexible, flat metal strip which is able to conform to the internal curves of the duct.

In a second embodiment of the present invention, where the light sources are of generally rounded form, the moving means may comprise a flexible conduit able to adapt to the curvature of the duct. Similarly, as described above, the power supply cables to the light source may be run through the flexible conduit.

In the first and second embodiments of moving means described above, the internal duct walls provide adequate support to the moving means whilst the light source and carrier is being pushed through the duct.

Other embodiments of moving means may comprise rotatable pulley wheels in fixed positions at least adjacent the first and second sides of the duct having an endless cable therearound and the carrier means in the endless cable loop.

Ducts which are of substantially linear form may employ rigid moving means to push the light source from one side to the other.

Power source supplies to the lighting assembly of the present invention may be conventional and will not be elaborated upon further.

A separate closed translucent cover on the wall on the first side may be provided if desired but is not necessary as is the case with prior art designs.

At the second side of the lighting assembly, remote from the hazardous area, the duct orifice may be provided with a closure having a seal, thus sealing the duct second side if any damage should occur to the glass of the lighting assembly at the first side.

The container housing at the second side of the wall may also be provided with a closure cover having a seal therearound to provide a further safety margin in the event of damage to the assembly on the first side.

Fluid coolant supplies may be provided in the lighting assembly of the present invention to enable cooling of the light source to prolong the life thereof. Such coolant supplies may be provided through flexible conduits which run through the moving means with the power supply cables or may be provided through conduits which are fixed within the container housing. Since the interior of the duct and the container housing are both sealed off from the environments on both the first and second sides of the wall, it may only be necessary to provide a fluid inlet to the container housing in the region of the light source and a fluid outlet at another position or positions. The fluid coolant system may be a closed circuit with pumping means and heat exchanging means for example.

In order that the present invention may be more fully understood, examples of the present invention will now be described by way of illustration only with reference to the accompanying drawings, of which:

BRIEF DESCRIPTION OF THE DRAWINGS

FIGS. 6A and 6B show a perspective view and a diagrammatic view in elevation respectively of flexible moving means for the embodiment of FIG. 1;

FIG. 8 shows a schematic cross section in elevation of a third embodiment of a lighting assembly according to the present invention;

FIG. 9 shows a detail of the embodiment of FIG. 8;

FIG. 10 shows a plan view of an alternative carriage and moving means which may be used in the duct shown in FIGS. 1, 5 and 7;

FIGS. 11A and 11B shows side views of the carriage of FIG. 10 in different positions in a generally sinusoidal duct as shown in FIGS. 1, 5 and 7.

DETAILED DESCRIPTION OF THE DRAWINGS

Figure 1:
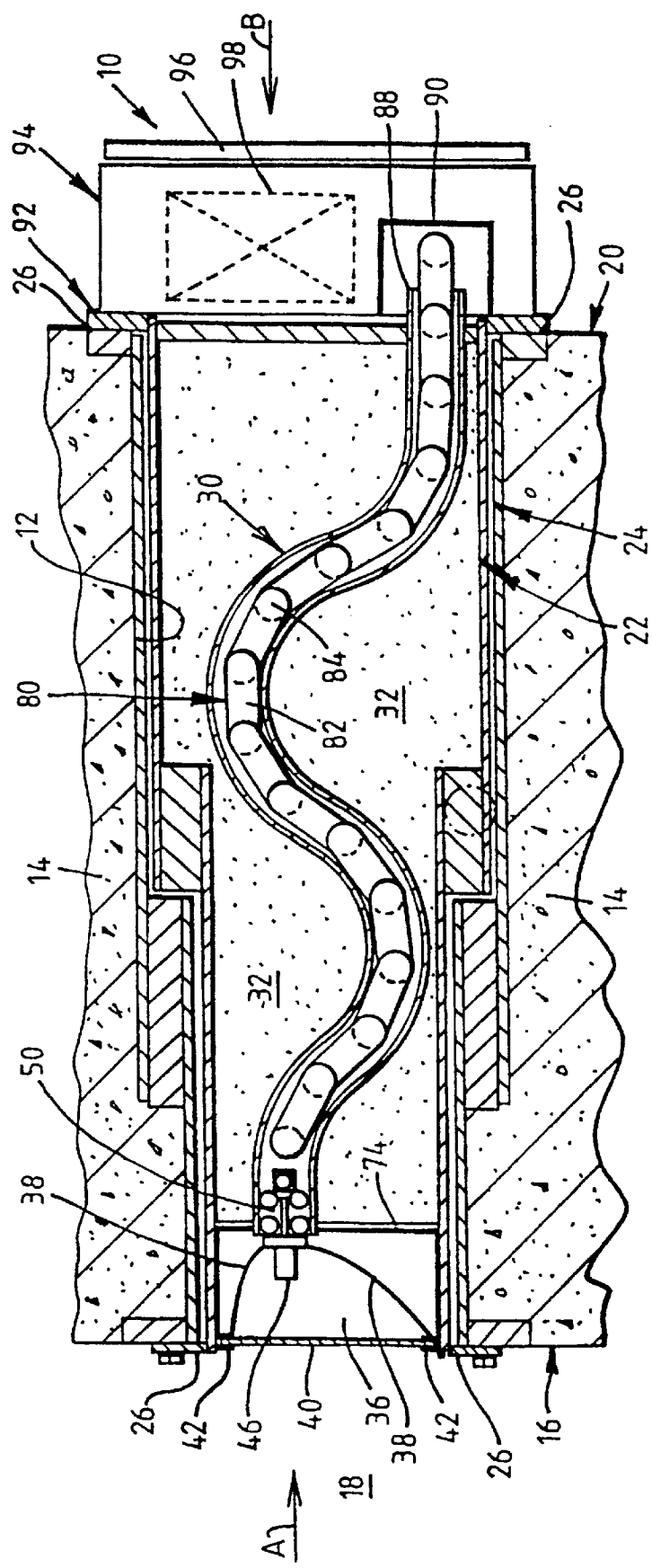
FIG. 1 shows a cross section in elevation of a first embodiment of a lighting assembly according to the present invention situated in a wall.
Figure 2:
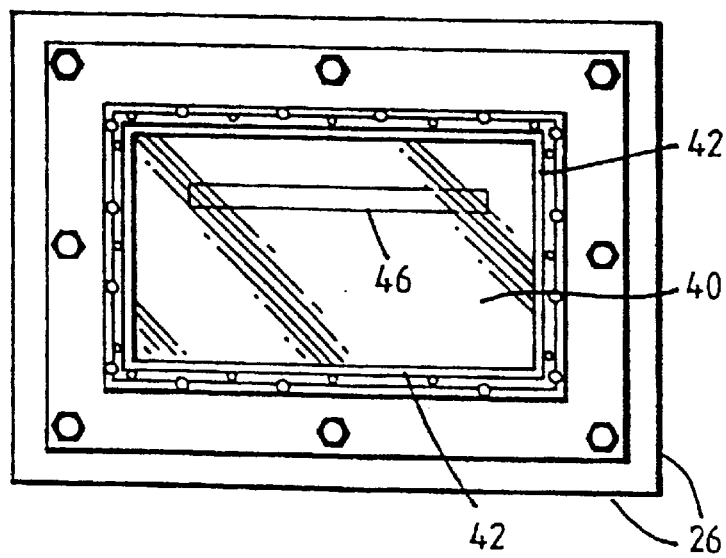
FIG. 2 shows a view of the first side in the direction of the arrow A of FIG. 1.
Figure 3:
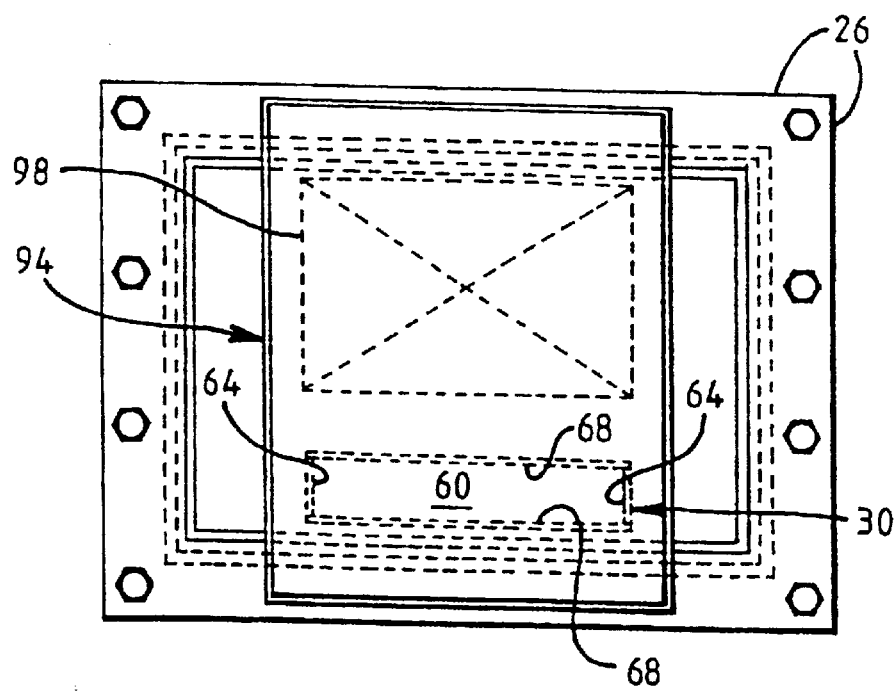
FIG. 3 shows a view of the second side in the direction of the arrow B of FIG. 1.
Figure 4A:
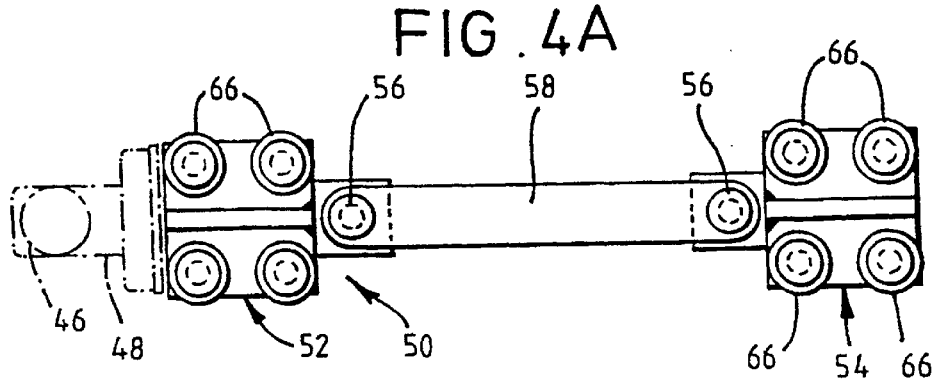
FIGS. 4A and 4B show a plan and side elevation of carrier means for the embodiment of FIG. 1.
Figure 4B:
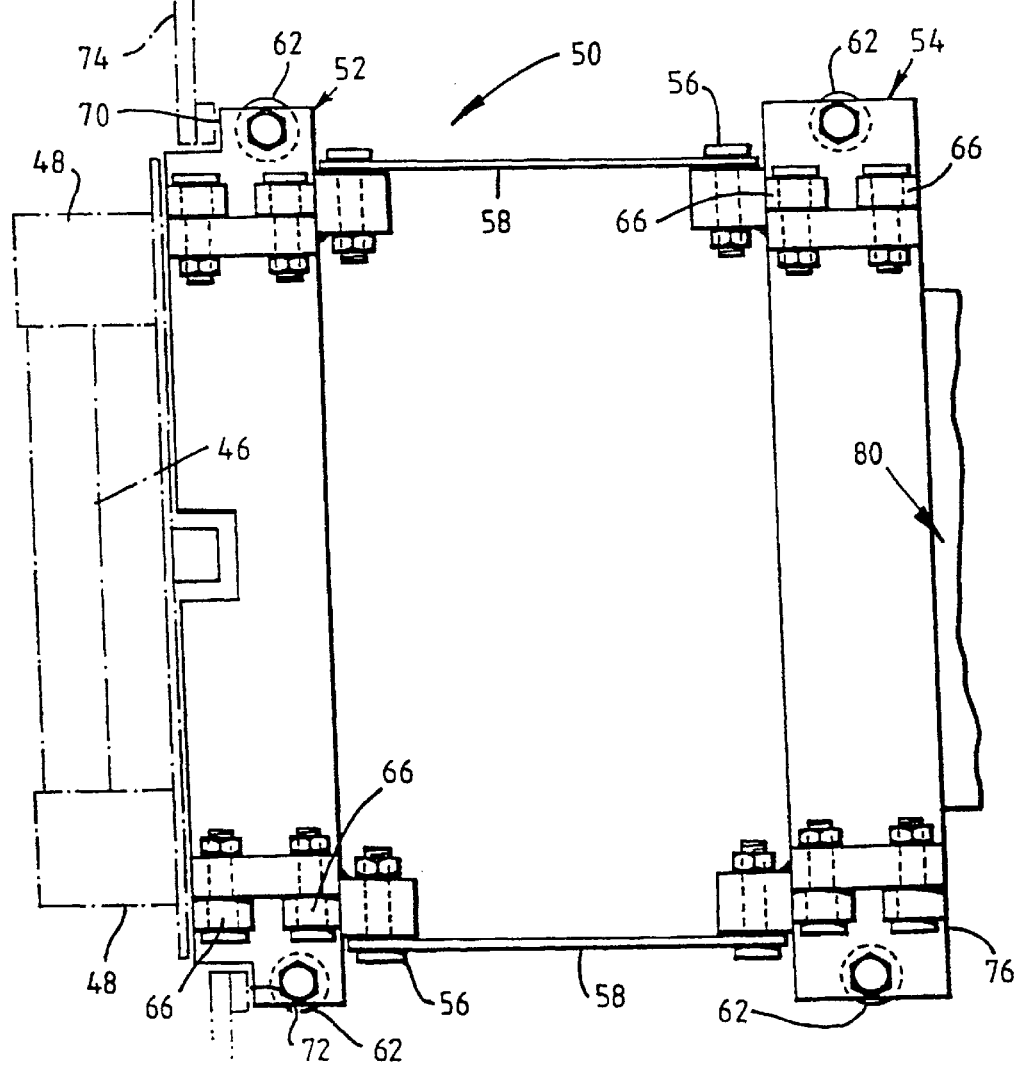
Figure 5:
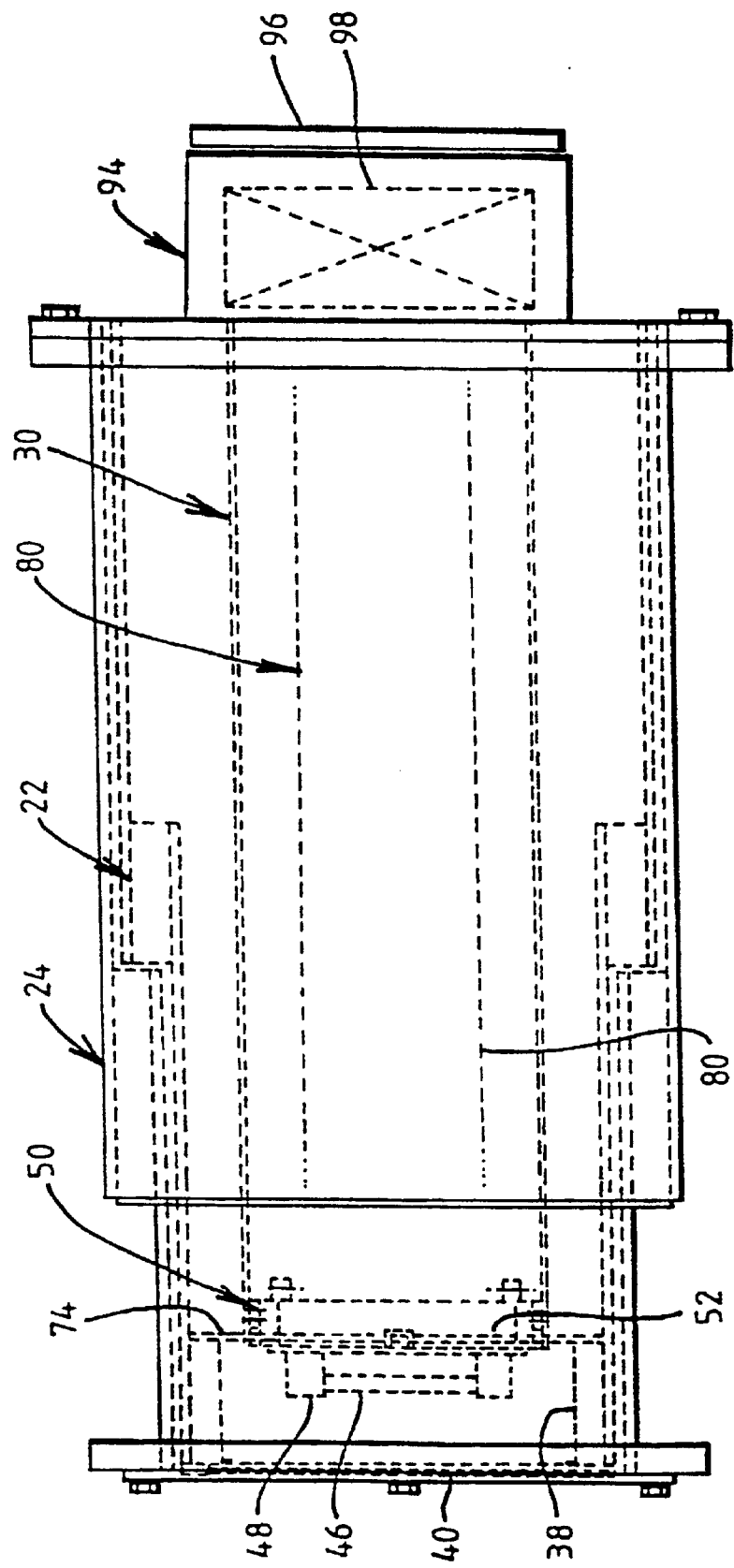
FIG. 5 shows a plan view of the embodiment of FIG. 1.

Referring now to FIGS. 1 to 6 and where the same features are denoted by common reference numerals. A lighting assembly according to a first embodiment of the present invention is indicated generally at 10 and is fixed within an aperture 12 of a wall 14 which has a first side 16 at the side of a hazardous closed-off area 18 and a second side 20 sealed off from the hazardous area 18 and accessible to operators. The lighting assembly comprises a container housing indicated generally at 22 and which is close fit inside a lining indicated generally at 24 inside the wall aperture 12. Seals 26 are provided between the lining 24 and housing 22 to prevent any egress of contaminants from the first side 16 to the second side 20. A duct 30 of non-linear shape is provided extending between the first side 16 and the second side 20; the duct being of a shape which prevents there being any direct shine path from the first side to the second side and also preventing any danger of γ rays passing from the first to the second side by internal reflection. The duct 30 is fixed within the container housing 22 and surrounded by concrete grout 32. At the end of the duct 30 adjacent the first side 16 there is a volume 36 in which a reflector 38 is positioned, the volume 36 being sealed off from the area 18 by a glass window panel 40 set in seals 42 in the container housing 22. The end of the housing 22 and the glass panel 40 are substantially flush with the wall face second side 16 which is an advantage since there is no ledge formed on which hazardous debris may settle should the housing 22 ever have to be removed from the aperture 12. The duct which is of rectangular cross section 44 is open to the volume 36 to allow access thereto of a light source 46 which is of elongate tubular cross section, in this case a high intensity sodium lamp. The lamp 46 is mounted on power supply sockets 48 at the front end of a carrier trolley 50 (see FIGS. 4A and 4B) which comprises two articulated bogeys 52, 54 linked by pivoted 56 members 58 to each other (N.B. only the front bogey 52 is shown in FIG. 1); the bogeys 52, 54 are guided within the rectangular internal cavity 60 of the duct 30 by jockey wheels 62 running against the vertical walls 64 of the cavity 60 and jockey wheels 66 running against the horizontal walls 68 of the cavity 60 thus positioning both the trolley 50 and lamp 46 within the duct. The lamp 46 is automatically located in its desired position by vertical flange faces 70 of the front bogey 52 meeting co-operating faces 72 of a plate 74 at the rear of the volume 36. To the rear face 76 of the rear bogey 54 is fixed a flexible trolley moving member 80 shown in part only (see also FIGS. 6A and 6B) which comprises the type of plastics material chain-track commonly used for grouping together and protecting cables in conveyors and machine tools for example. The construction of the flexible member 80 is shown in more detail in FIGS. 6A and 6B and comprises hollow, generally box-shaped segments 82 pivoted to each other at 84 allowing flexibility in the vertical plane as seen in FIG. 1. The member 80 is constrained by the internal walls of the duct 30 and is able to apply a pushing and/or pulling force as required to the trolley 50 so as to position the lamp 46 in its desired position. The flexible member extends through the duct cavity 60 and when the lamp 46 is in its desired position the remote end 88 of the duct 30 is sealed off by a closure member 90 such that if the glass 40 should be broken or damaged for any reason, no contaminants will emerge from the end 88 of the duct 30. The end 92 of the housing 22 is closed off and sealed by a second closure 94 having an access door 96 sealable thereto and which contains the electrical power supply, indicated only by dashed lines 98, to the lamp 46, the power cables being routed through the hollow box-shaped segments 82.

In operation to place or remove the lamp 46 it is only necessary to insert the flexible member 80 in the duct 30 and push it home and close off the end 88 with the closure 90; the articulated trolley 50 guiding the lamp 46 to its desired position. Thus, replacement of the lamp 46 is a matter of minutes rather than the cumbersome procedure of many man-hours of prior art systems.

Figure 7:
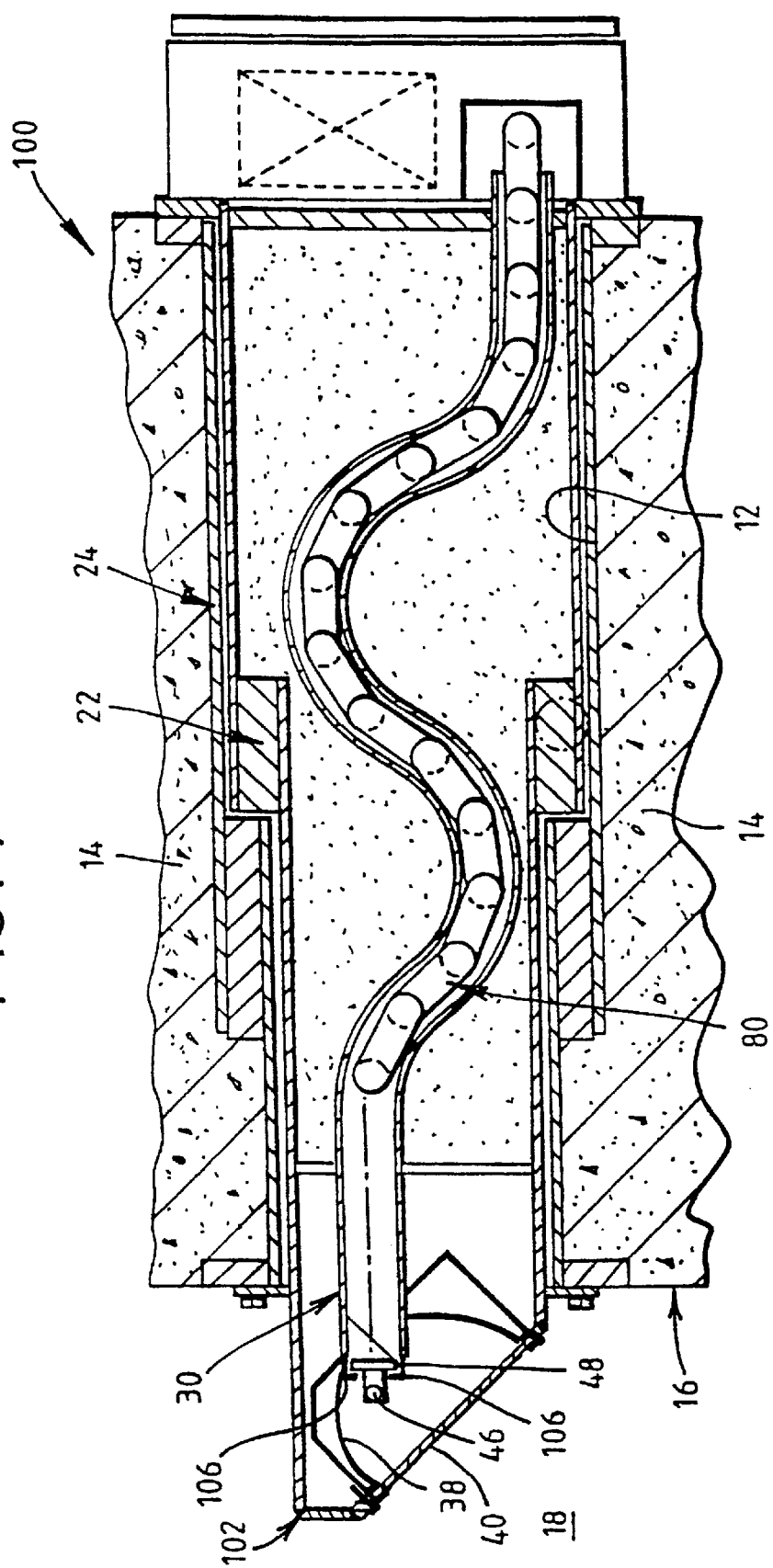
FIG. 7 shows cross section in elevation of a second embodiment of the lighting assembly according to the present invention.
Figure 12:
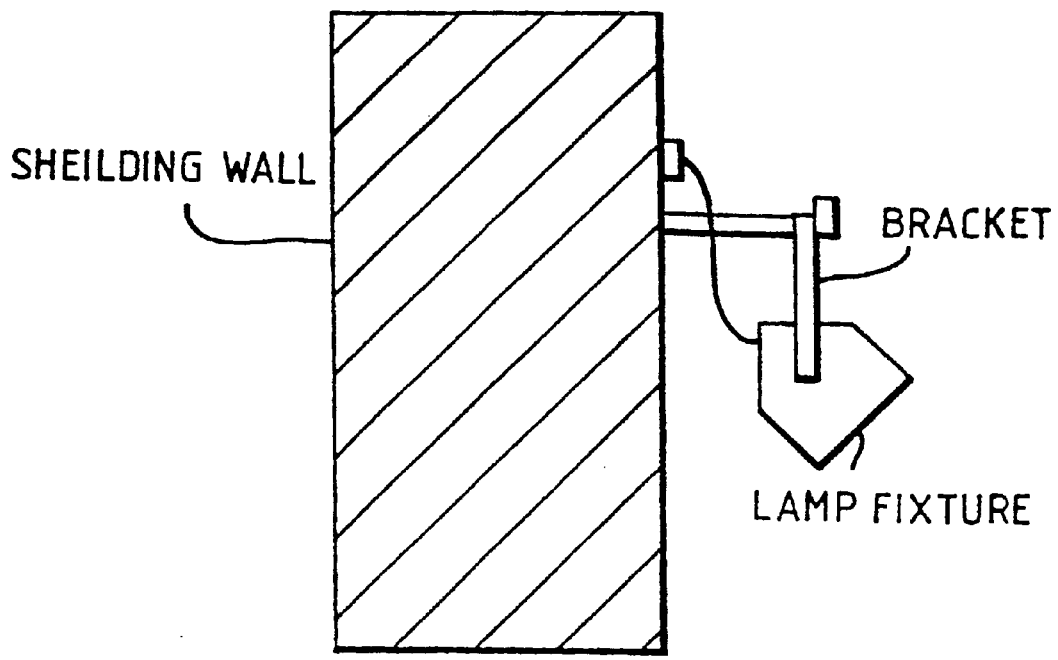
FIGS. 12 and 13 which show prior art arrangements of lighting systems for hazardous areas.
Figure 13:
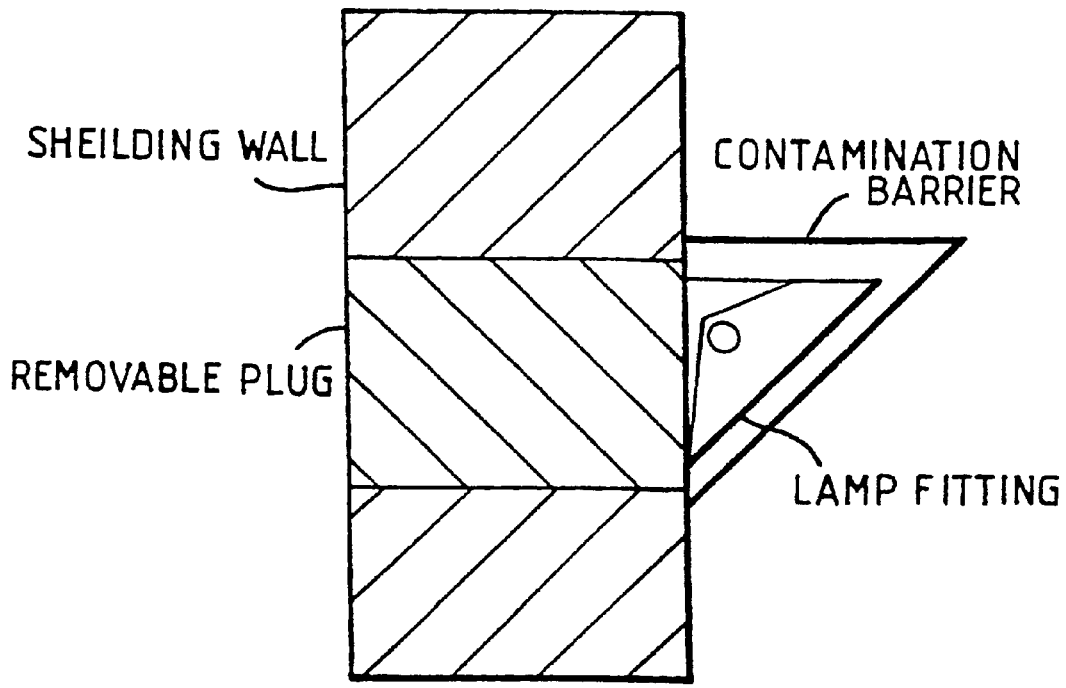

FIG. 7 shows a second embodiment indicated generally at 100 of a lighting assembly of the present invention. In essence this embodiment is similar to that of 10, however, in this case there is a projection 102 allowing a more downwardly lighting direction for illuminating objects in the area 18. As before, there is a container housing 22 closely fitting a liner 24 fixed within an aperture 12 in the wall 14. In this embodiment the duct 30 is provided with inturned flanges 106 at its end adjacent the first side 16 to act as location means against the lamp holder 48 so allowing the lamp to be in its desired position relative to the reflector 38. All other features of this second embodiment are similar to those of embodiment 10.

FIGS. 8 and 9 show a third embodiment indicated generally at 120 of a lighting assembly according to the present invention. This embodiment comprises an outer container housing 122 fixed in a wall 124 having a first side 126 and a second side 128. The housing 122 contains a plurality of ducts 130 which are twisted together into the form of a helix. As with previous embodiments, there is no direct shine path from the first side 126 to the second side 128. Each duct 130 is of circular cross section and receives a light source 132 in form of a halogen bulb in a holder assembly 134 which also constitutes the carrier means. The holder assembly comprises a bulb holder 140 per se and a shroud and reflector assembly 142 which is adapted to slide within the duct tube 130. The rear end 144 of the shroud 142 is fixed to moving means 146 which is in the form of a flexible conduit having power supply cables 148 passing therethrough. The bulb 132 and carrier assembly 134 is located in position adjacent the first side by the forward rim 150 of the shroud 142 abutting against a glass window 152 at the first side. At the end 156 at the second side, there are, as before, a suitable power supply and sealable doors (not shown) to isolate the first side from the second side. Although not shown in FIGS. 8 and 9, the assembly may also include a liner to the wall aperture 160 within which the housing 122 may be fitted. Similarly, the free space within the housing 122 may be filled with concrete grout 160. Various sealing arrangements which are within the capability of a person skilled in the mechanical engineering art may be devised and fitted so obviating any possibility of leakage paths for contaminants from the first side to the second side.

FIGS. 10 and 11A and 11B shown an alternative form of carriage 200 and moving means 202 which, although shown only in part, extends through the entire length of the duct 30 of FIG. 1 when the lamp 46 is in position at the first side. The carriage 200 comprises a frame 204 of fabricated sheet metal; the frame having jockey wheels 206 running on the horizontal surface of the duct 30. Pivoted to the frame 204 at the front axle of the jockey wheels 206 is a lamp carrier member 208 including a lamp socket 210 and an independent jockey wheel 212. Thus, the lamp 46 is supported away from the duct floor and is able to follow the generally sinusoidal duct shape (indicated by the dashed line 216) in either an upwardly 220 or a downwardly 222 direction as indicated in FIGS. 11A and 11B respectively. The rear of the frame 204 has a flexible, flat push/pull strip 202 of metal or plastics material attached thereto which is sufficiently flexible to allow the carriage 200 to be pushed home through the duct 30.

What is claimed is:

1. A lighting assembly which extends through the thickness of a wall having a first side and a second side, the assembly comprising:

a container housing extending through an aperture in said wall from the first side to the second side of the wall;

at least one light source to illuminate an area on the first side of said wall; and means being included within the container housing to enable replacement of said light source from the second side of said wall wherein said means includes:

at least one fixed duct extending at least part of the way from the first side of the wall to the second side of the wall within the container housing;

light source carrier means on which said light source is mounted, said light source carrier means and said light source being movable through said at least one duct from said second side to said first side and from said first side to said second side;

moving means to move said light source and said carrier means through said at least one duct; and power supply means to said light source;

the lighting assembly being characterized in that a shape of the fixed duct is non-linear; in that said moving means are flexible and in that in use a failed light source is removed from the duct adjacent the second side of the wall by retraction of the moving means.

2. A lighting assembly according to claim 1 wherein the shape of said non-linear duct is selected from the group consisting of generally sinusoidal and helical.

3. A lighting assembly according to claim 1 further comprising location means at the first side to locate the light source in a desired position.

4. A lighting assembly according to claim 1 wherein an end of the container housing adjacent the first side of the wall includes reflector means.

5. A lighting assembly according to claim 1 wherein a volume of the container housing about the duct is filled with grout.

6. A lighting assembly according to claim 1 wherein the duct has a rectangular cross section.

7. A lighting assembly according to claim 1 wherein the duct has a substantially circular cross section.

8. A lighting assembly according to claim 7 wherein there are a plurality of ducts in the assembly.

9. A lighting assembly according to claim 1 wherein the carrier means comprises one of a trolley and a bogey on which the light source is mounted.

10. A lighting assembly according to claim 9 wherein the trolley has means to maintain the trolley in a desired spatial orientation and position within the duct.

11. A lighting assembly according to claim 10 wherein said means to maintain the trolley comprises jockey wheels running on at least one of internal horizontal and vertical surfaces of the duct.

12. A lighting assembly according to claim 1 wherein the flexible moving means comprises a chain-track conveyor having segments in linear array and pivoted to each other.

13. A lighting assembly according to claim 1 wherein the flexible moving means comprises a flexible conduit able to adapt to the curvature of the duct.

14. A lighting assembly according to claim 1 wherein the moving means comprises a flexible, flat strip.

15. A lighting assembly according to claim 1 wherein the moving means comprises rotatable pulley wheels in fixed positions at least adjacent the first and second sides of the duct and having an endless cable therearound and the carrier means in the endless cable loop.

16. A lighting assembly according to claim 1 wherein a duct orifice at the second side is provided with a closure having a seal therearound.

17. A lighting assembly according to claim 1 further including a fluid coolant supply to enable cooling of the light source.

* * * * *